(12) United States Patent
Kim

(10) Patent No.: US 11,512,759 B2
(45) Date of Patent: Nov. 29, 2022

(54) HYBRID APPARATUS FOR VEHICLE

(71) Applicant: Hyundai Transys Inc., Seosan-si (KR)

(72) Inventor: Tae Hoon Kim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 249 days.

(21) Appl. No.: 17/113,050

(22) Filed: Dec. 6, 2020

(65) Prior Publication Data

US 2021/0356016 A1 Nov. 18, 2021

(30) Foreign Application Priority Data

May 18, 2020 (KR) .......................... 10-2020-0059269

(51) Int. Cl.
| | |
|---|---|
| *F16F 15/129* | (2006.01) |
| *B60K 6/405* | (2007.10) |
| *B60K 6/26* | (2007.10) |
| *H02K 7/00* | (2006.01) |

(52) U.S. Cl.
CPC .............. *F16F 15/129* (2013.01); *B60K 6/26* (2013.01); *B60K 6/405* (2013.01); *F16F 2230/0023* (2013.01); *H02K 7/003* (2013.01)

(58) Field of Classification Search
None
See application file for complete search history.

(56) References Cited

U.S. PATENT DOCUMENTS

| | | | | | |
|---|---|---|---|---|---|
| 5,789,823 | A | * | 8/1998 | Sherman ................. | F16H 61/62 |
| | | | | | 290/46 |
| 6,354,974 | B1 | * | 3/2002 | Kozarekar ............... | B60K 6/26 |
| | | | | | 903/910 |
| 6,862,887 | B2 | * | 3/2005 | Noreikat ................ | B60K 6/442 |
| | | | | | 903/952 |
| 8,287,412 | B2 | | 10/2012 | Lee et al. | |
| 8,978,799 | B2 | * | 3/2015 | Arnold ..................... | B60K 6/48 |
| | | | | | 310/78 |
| 9,267,554 | B2 | * | 2/2016 | Reitz ........................ | B60K 6/26 |
| 9,873,317 | B2 | * | 1/2018 | Ohnemus ................. | B60K 6/48 |
| 2003/0106729 | A1 | | 6/2003 | Noreikat et al. | |
| 2007/0007059 | A1 | * | 1/2007 | Nomura .................. | B60L 50/61 |
| | | | | | 180/65.29 |

FOREIGN PATENT DOCUMENTS

| | | | | |
|---|---|---|---|---|
| DE | 10018926 | A1 * | 11/2000 | ............ B60K 6/26 |
| DE | 102007024126 | A1 * | 12/2008 | ............ B60K 6/387 |
| DE | 102012206292 | A1 * | 11/2012 | ............ B60K 6/26 |
| DE | 102016211943 | A1 * | 1/2018 | ............ B60K 6/40 |
| DE | 102016225972 | A1 * | 6/2018 | ............ B60K 6/48 |

(Continued)

*Primary Examiner* — Dirk Wright
(74) *Attorney, Agent, or Firm* — Novick, Kim & Lee PLLC; Jae Youn Kim

(57) ABSTRACT

An exemplary embodiment of the present invention provides a hybrid apparatus provided in a housing having one side coupled to a transmission and the other side coupled to an engine, the hybrid apparatus including: a P1 motor and a P2 motor; and a torsion damper disposed between the P1 motor and the P2 motor, in which the torsion damper includes an anti-scattering unit configured to prevent foreign substances, which are generated by compression of the torsion damper, from being released and introduced into the P1 motor and the P2 motor.

6 Claims, 3 Drawing Sheets

(56) References Cited

FOREIGN PATENT DOCUMENTS

| DE | 102018114382 A1 * | 12/2019 | ............. B60K 17/24 |
|----|-------------------|---------|--------------------------|
| JP | 2002-510780 A | 4/2002 | |
| JP | 2011524292 A * | 9/2011 | |
| KR | 10-2010-0037204 A | 4/2010 | |
| KR | 10-2013-0065392 A | 6/2013 | |
| WO | WO-2008092426 A2 * | 8/2008 | ............... B60K 6/26 |
| WO | WO-2008092426 A3 * | 11/2008 | ............... B60K 6/26 |
| WO | WO-2015040284 A1 * | 3/2015 | ............... B60K 6/40 |
| WO | WO-2018001620 A1 * | 1/2018 | ............... B60K 6/40 |
| WO | WO-2018114228 A1 * | 6/2018 | ............... B60K 6/48 |

* cited by examiner

HYBRID APPARATUS FOR VEHICLE

CROSS-REFERENCE TO RELATED APPLICATIONS

This application claims priority to and the benefit of Korean Patent Application No. 10-2020-0059269 filed in the Korean Intellectual Property Office on May 18, 2020, the entire contents of which are incorporated herein by reference.

TECHNICAL FIELD

The present invention relates to a hybrid apparatus for a vehicle, and more particularly, to a hybrid apparatus for a vehicle, which is capable of preventing foreign substances from being introduced into a motor.

BACKGROUND ART

In general, a hybrid vehicle refers to a vehicle driven by an efficient combination of two or more different types of power sources, that is, a vehicle driven by an engine which obtains rotational force by combusting fuel (fossil fuel such as gasoline), and a motor which obtains rotational force from electric power of a battery.

Research is being currently and actively conducted on the hybrid vehicle as a future vehicle capable of reducing exhaust gas and improving fuel economy by adopting the motor as an auxiliary power source as well as the engine.

The hybrid vehicle typically uses the engine and the motor. The hybrid vehicle uses the motor, as a main power source, which has relatively good low-speed torque characteristics, at a low speed, and uses the engine, as a main power source, which has relatively good high-speed torque characteristics, at a high speed.

Therefore, in a low-speed section, the hybrid vehicle uses the motor while stopping the operation of the engine that uses fossil fuel, and thus the hybrid vehicle has an excellent effect of improving fuel economy and reducing exhaust gas.

The hybrid vehicle travels in an electric vehicle (EV) mode which is a pure electric vehicle mode in which only the rotational force of the motor is used to drive the hybrid vehicle, or in an operation mode such as a hybrid electric vehicle (HEV) mode in which the rotational force of the motor is used as auxiliary power while the rotational force of the engine is used as main power. The mode is switched from the EV mode to the HEV mode by starting the engine.

For example, a mild hybrid apparatus may implement an output at a level corresponding to a full hybrid level within a short time by a combination of two or more motors.

The mild hybrid apparatus is generally classified into P0, P1, P2, P3, and P4 depending on the positions of the motor, and the respective apparatuses have differences in accordance with whether the EV mode is implemented, regenerative braking performance, and the like.

Meanwhile, a torsion damper may be provided in the hybrid apparatus, and as the torsion damper is repeatedly compressed, the torsion damper may be abraded due to friction.

In this case, foreign substances generated by the abrasion of the torsion damper may scatter into the hybrid apparatus, and metallic foreign substances may be attached to a rotor of a motor in the hybrid apparatus because the rotor may have a magnet.

Therefore, the metallic foreign substances attached to the rotor may have an adverse effect on performance of the motor.

SUMMARY OF THE INVENTION

The present invention has been made in an effort to provide a hybrid apparatus which seals a torsion damper to prevent foreign substances, which are generated by friction of a torsion damper, from being introduced into a motor, thereby improving performance of the motor.

An exemplary embodiment of the present invention provides a hybrid apparatus provided in a housing having one side coupled to a transmission and the other side coupled to an engine, the hybrid apparatus including: a P1 motor and a P2 motor; and a torsion damper disposed between the P1 motor and the P2 motor, in which the torsion damper includes an anti-scattering unit configured to prevent foreign substances, which are generated by compression of the torsion damper, from being released and introduced into the P1 motor and the P2 motor.

In the housing, the P1 motor may be disposed closer to the engine than the P2 motor.

The P1 motor may include a P1 stator and a P1 rotor, and a P1 rotor shaft may be connected to the P1 rotor.

The P1 rotor shaft may be formed to surround at least a part of the torsion damper when viewed from the engine.

One end of the anti-scattering unit may be coupled to an end of the P1 rotor shaft positioned in a direction of the transmission, and the other end of the anti-scattering unit may be coupled to the torsion damper.

The P1 rotor shaft may further include a groove portion recessed in a direction of the P1 rotor, and the foreign substances may be introduced into the groove portion.

According to the present invention, the structure for sealing the torsion damper may prevent foreign substances, which are generated by compression of the torsion damper, from being introduced into the P1 motor or the P2 motor, thereby improving performance of the P1 motor or the P2 motor.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
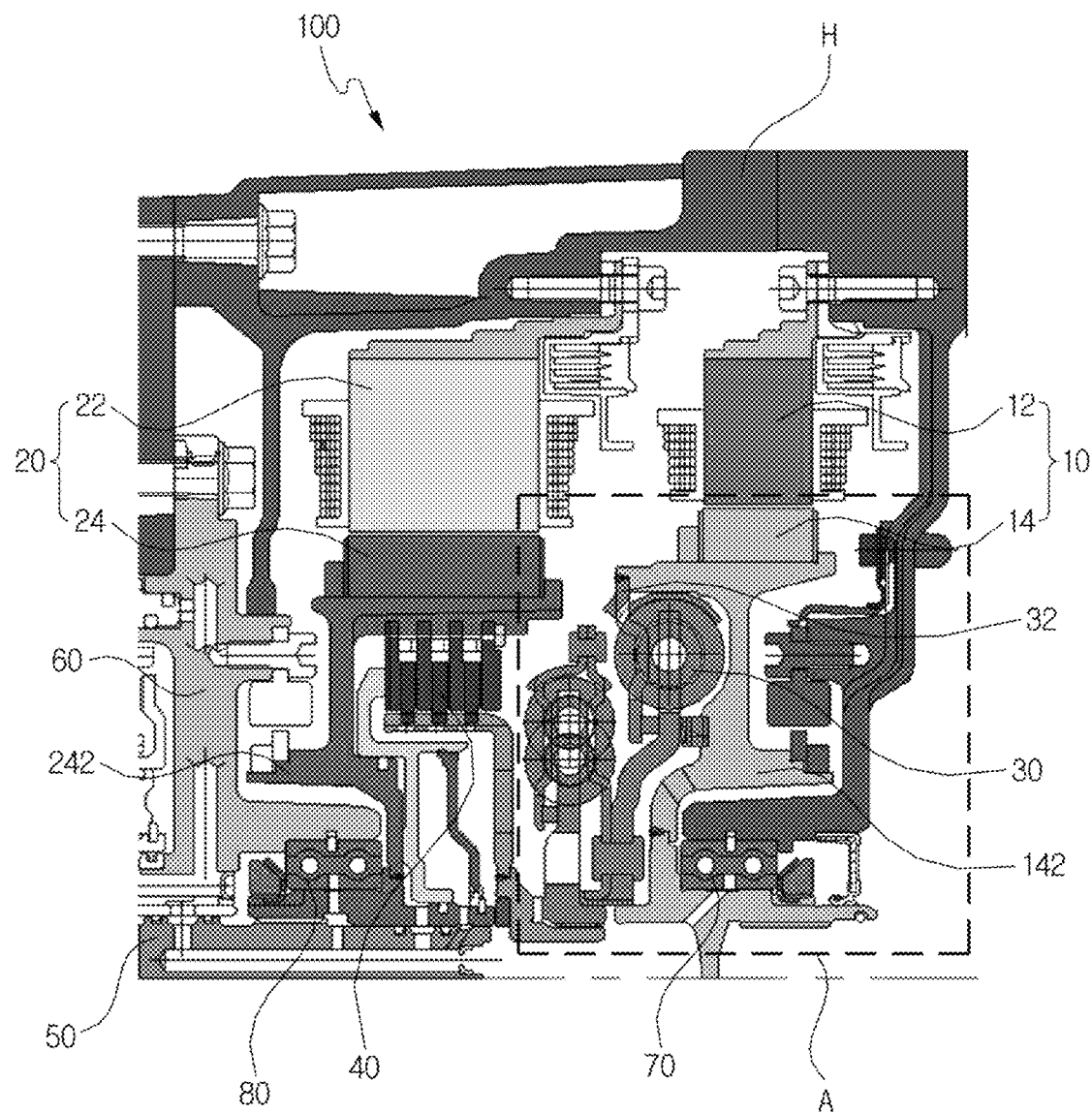
FIG. 1 is a view illustrating a hybrid apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly-known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

FIG. 1 is a view illustrating a hybrid apparatus 100 according to an exemplary embodiment of the present invention.

Referring to FIG. 1, the hybrid apparatus 100 may be provided in a housing H.

In the housing H, the hybrid apparatus 100 may have a P1 motor 10, a P2 motor 20, a torsion damper 30, and an engine clutch 40.

Although not illustrated, the housing H may have one side coupled to a transmission (not illustrated) and have the other side coupled to an engine (not illustrated).

The P1 motor 10 may include a P1 stator 12 and a P1 rotor 14, and the P1 stator 12 may be fixed to the housing H, as illustrated in FIG. 1.

The P2 motor 20 may also include a P2 stator 22 and a P2 rotor 24, and the P2 stator 22 may be fixed to the housing H, as illustrated in FIG. 1.

For example, the P1 rotor 14 may be connected to a P1 rotor shaft 142, and the P2 rotor 24 may be connected to a P2 rotor shaft 242.

The P1 rotor shaft 142 is spline-connected to an engine output shaft (not illustrated), such that the P1 rotor shaft 142 may receive rotational power, which is generated by an operation of the engine, through the engine output shaft.

As illustrated in FIG. 1, the P1 motor 10 may be disposed closer to the engine than the P2 motor 20.

The torsion damper 30 may be disposed between the P1 motor 10 and the P2 motor 20, and the engine clutch 40 may be spline-connected to the P2 rotor shaft 242.

For example, the torsion damper is also called a dual mass flywheel and may be installed between the engine and the transmission of the hybrid vehicle and configured to attenuate torsional vibration generated during power transmission.

The engine clutch 40 may be configured to allow or block transmission of rotational power from the engine to the transmission.

For example, the engine clutch 40 may be spline-connected to the torsion damper 30 and spline-connected to the P2 rotor shaft 242 as described above, such that the rotational power transmitted through the P1 rotor shaft 142 may be transmitted to the P2 rotor shaft 242.

The P2 rotor shaft 242 may be spline-connected to a transmission input shaft 50, and the transmission input shaft 50 may transmit the rotational power, which is transmitted through the P2 rotor shaft 242, to the transmission.

Meanwhile, as illustrated in FIG. 1, a first bearing 70 may be provided between one end (in a direction of the engine) of the housing H and an outer diameter portion of the P1 rotor shaft 142 in order to support the P1 rotor shaft 142 so that the P1 rotor shaft 142 is rotatable.

A support unit 60 for supporting the transmission input shaft 50 is provided at the other side (in a direction of the transmission) of the housing H, and a second bearing 80 is provided between an end of the support unit 60 and an outer diameter portion of the P2 rotor shaft 242 in order to support the P2 rotor shaft 242 so that the P2 rotor shaft 242 is rotatable.

Figure 2:
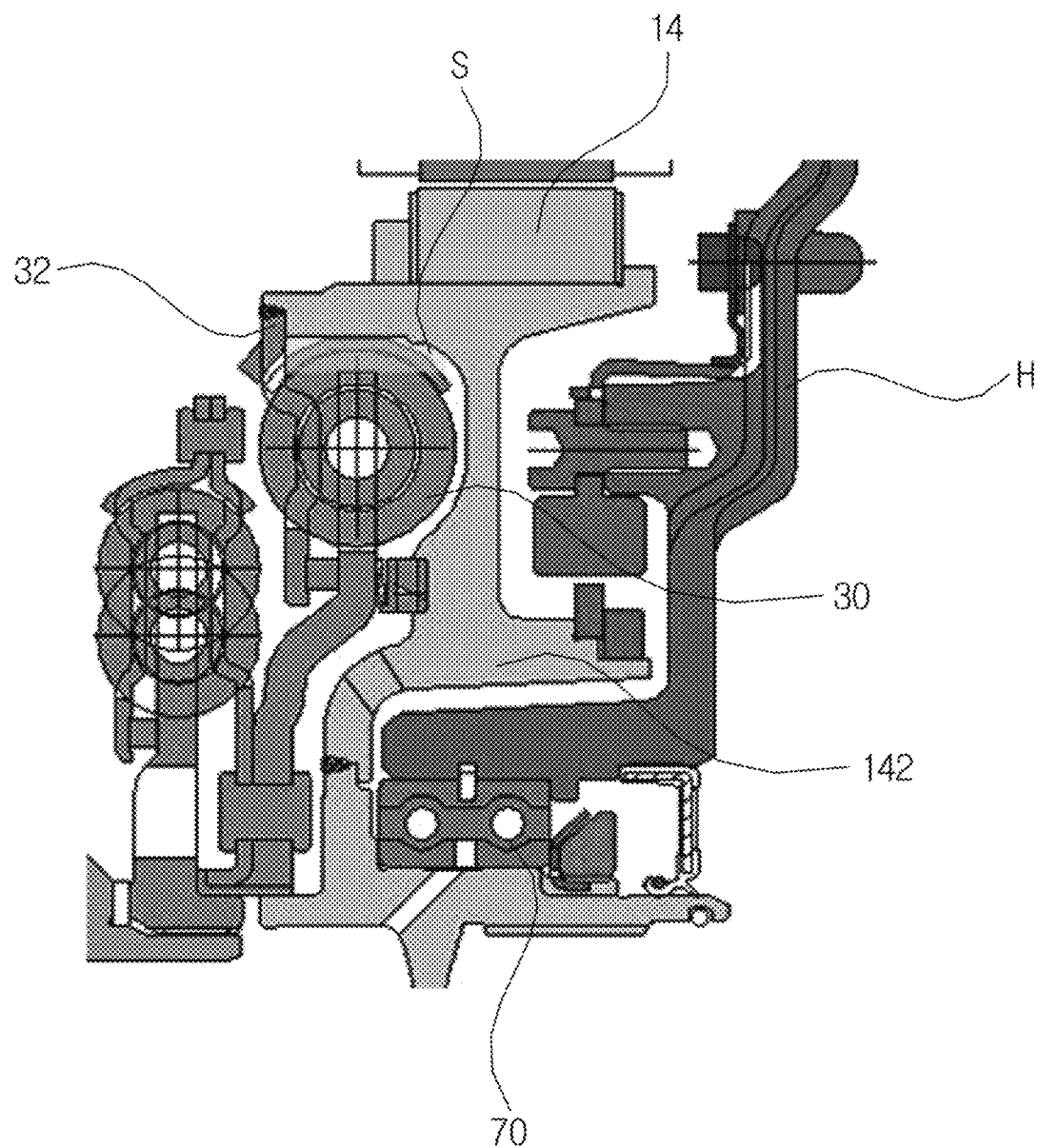
FIG. 2 is an enlarged view of part A in FIG. 1.

FIG. 2 is an enlarged view of part A in FIG. 1.

Hereinafter, a structure for sealing the torsion damper 30 according to the present invention will be described in detail with reference to FIGS. 1 and 2.

Referring to FIGS. 1 and 2, the P1 rotor shaft 142 may be formed to surround at least a part of the torsion damper 30 when viewed from the engine.

In this case, an open end may be formed at a side of the P1 rotor shaft 142 in the direction of the transmission.

In the exemplary embodiment of the present invention, as the torsion damper 30 is repeatedly compressed, the torsion damper 30 may be abraded due to friction.

Foreign substances S generated by the abrasion of the torsion damper 30 may be scattered into the housing H of the hybrid apparatus 100.

In this case, because the P1 rotor 14 or the P2 rotor 24 has magnetic substances, the scattered metallic foreign substances S may be attached to the P1 rotor 14 or the P2 rotor 24, which may cause a deterioration in performance of the motor.

Therefore, in the exemplary embodiment of the present invention, an anti-scattering unit 32 is provided to prevent the foreign substances S, which are generated by abrasion of the torsion damper 30, from being scattered into the housing H.

One end of the anti-scattering unit 32 may be coupled to the end (open end) of the P1 rotor shaft 142 positioned in the direction of the transmission.

For example, one end of the anti-scattering unit 32 may be coupled to the end of the P1 rotor shaft 142 by welding.

And, the anti-scattering unit 32 may be configured to support a spring in the torsion damper 30 to maintain a posture of the spring.

The other end of the anti-scattering unit 32 may be coupled to the torsion damper 30.

As described above, one side (in the direction of the engine) of the torsion damper 30 may be surrounded by the P1 rotor shaft 142, and the other side (in the direction of the transmission) of the torsion damper 30 may be sealed by the anti-scattering unit 32.

Therefore, the foreign substances S generated by the abrasion of the torsion damper 30 cannot be scattered to the outside, but may remain in a space sealed by the P1 rotor shaft 142 and the anti-scattering unit 32.

Because the P1 rotor 14 is consistently rotated by the rotational power transmitted from the engine, the foreign substances S may be rotated by centrifugal force of the P1 rotor 14 and then accumulated in the sealed space, as illustrated in FIG. 2.

The sealing structure may prevent the foreign substances S, which are generated by compression of the torsion damper 30, from being introduced into the P1 motor 10 or the P2 motor 20, thereby improving performance of the P1 motor 10 or the P2 motor 20.

Figure 3:
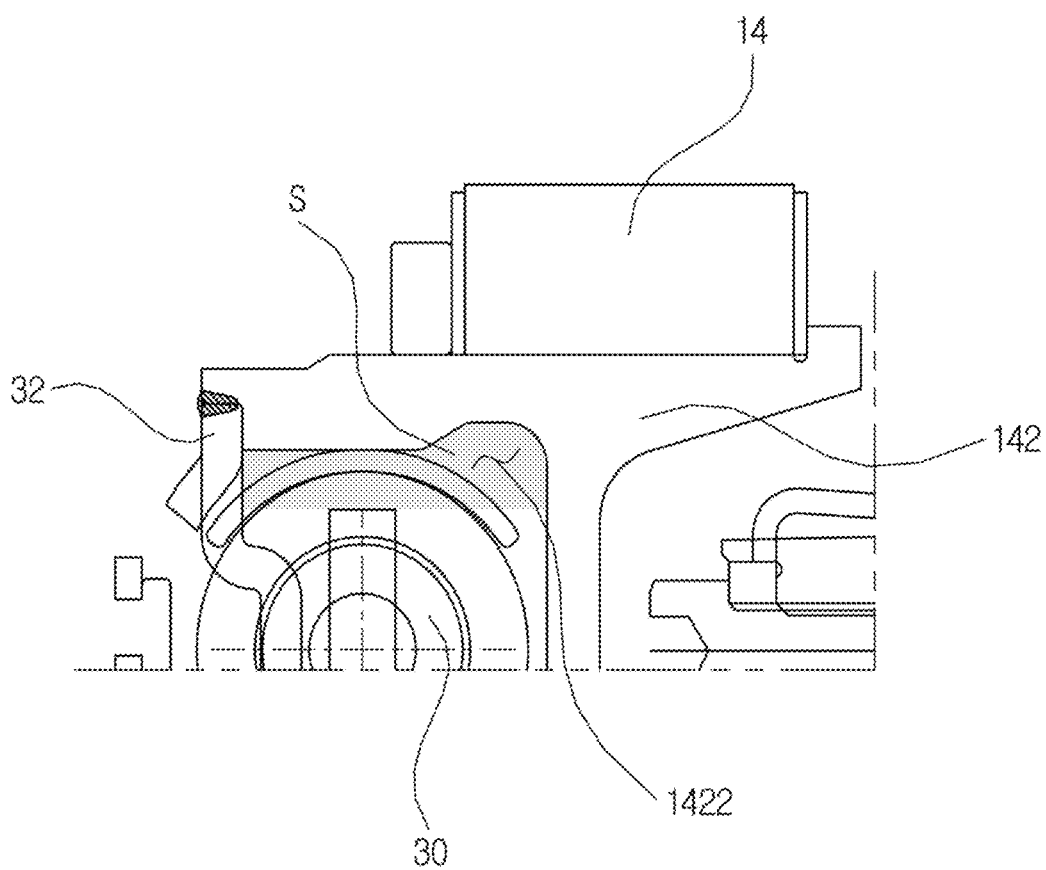
FIG. 3 is a view illustrating another exemplary embodiment of the present invention.

FIG. 3 is a view illustrating another exemplary embodiment of the present invention.

Like the exemplary embodiment described with reference to FIG. 2, even in another exemplary embodiment of the present invention, one side (in the direction of the engine) of the torsion damper 30 may be surrounded by the P1 rotor shaft 142, and the other side (in the direction of the transmission) of the torsion damper 30 may be sealed by the anti-scattering unit 32.

Referring to FIG. 3, the P1 rotor shaft 142 further includes a groove portion 1422 recessed in a direction of the P1 rotor 14.

As described above, the foreign substances S may be rotated by the centrifugal force of the P1 rotor 14 and then accumulated in the sealed space. However, according to another exemplary embodiment of the present invention, as illustrated in FIG. 3, the groove portion 1422 may be provided to further increase the amount of foreign substances S to be captured.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A hybrid apparatus provided in a housing having one side coupled to a transmission and the other side coupled to an engine, the hybrid apparatus comprising:
   a P1 motor and a P2 motor; and
   a torsion damper disposed between the P1 motor and the P2 motor,
   wherein the torsion damper comprises an anti-scattering unit configured to prevent foreign substances, which are generated by compression of the torsion damper, from being released and introduced into the P1 motor and the P2 motor.

2. The hybrid apparatus of claim 1, wherein in the housing, the P1 motor is disposed closer to the engine than the P2 motor.

3. The hybrid apparatus of claim 1, wherein the P1 motor comprises a P1 stator and a P1 rotor, and a P1 rotor shaft is connected to the P1 rotor.

4. The hybrid apparatus of claim 3, wherein the P1 rotor shaft is formed to surround at least a part of the torsion damper when viewed from the engine.

5. The hybrid apparatus of claim 4, wherein one end of the anti-scattering unit is coupled to an end of the P1 rotor shaft positioned in a direction of the transmission, and the other end of the anti-scattering unit is coupled to the torsion damper.

6. The hybrid apparatus of claim 3, wherein the P1 rotor shaft further comprises a groove portion recessed in a direction of the P1 rotor, and the foreign substances are introduced into the groove portion.

\* \* \* \* \*